US011563785B1

(12) United States Patent
    Rakshit

(10) Patent No.: US 11,563,785 B1
(45) Date of Patent: Jan. 24, 2023

(54) CHAT INTERACTION WITH MULTIPLE VIRTUAL ASSISTANTS AT THE SAME TIME

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/376,224

(22) Filed: Jul. 15, 2021

(51) Int. Cl.
*H04L 65/4038* (2022.01)
*H04L 65/1069* (2022.01)
*G06T 13/40* (2011.01)
*H04L 51/02* (2022.01)
*H04L 65/1083* (2022.01)

(52) U.S. Cl.
CPC .......... *H04L 65/4038* (2013.01); *G06T 13/40* (2013.01); *H04L 51/02* (2013.01); *H04L 65/1069* (2013.01); *H04L 65/1083* (2013.01)

(58) Field of Classification Search
CPC . H04L 65/4038; H04L 51/02; H04L 65/1069; H04L 65/1083; G06T 13/40
See application file for complete search history.

(56) References Cited

U.S. PATENT DOCUMENTS

| 9,148,394 B2 | 9/2015 | Lynch | |
| 9,823,811 B2 | 11/2017 | Brown | |
| 10,636,193 B1* | 4/2020 | Sheikh | G06V 20/20 |
| 10,809,876 B2 | 10/2020 | Brown | |
| 10,992,604 B1* | 4/2021 | Knas | H04L 65/1069 |
| 11,030,623 B2* | 6/2021 | Delaney | G06Q 20/4016 |
| 11,044,282 B1* | 6/2021 | Bhatt | H04L 67/38 |
| 11,238,656 B1* | 2/2022 | Lin | G06T 19/006 |
| 11,276,216 B2* | 3/2022 | Borovikov | G06N 20/00 |
| 2015/0186154 A1 | 7/2015 | Brown | |
| 2019/0155664 A1 | 5/2019 | Wood | |
| 2019/0332400 A1 | 10/2019 | Spoor | |
| 2020/0028803 A1 | 1/2020 | Helmy | |
| 2020/0137230 A1 | 4/2020 | Spohrer | |
| 2020/0166670 A1* | 5/2020 | Zass | G06T 13/40 |
| 2020/0259891 A1 | 8/2020 | Abraham | |
| 2021/0027511 A1* | 1/2021 | Shang | G06N 3/088 |
| 2021/0119945 A1 | 4/2021 | Sohum | |
| 2021/0312684 A1* | 10/2021 | Zimmermann | G06F 3/011 |

* cited by examiner

*Primary Examiner* — Joseph L Greene
(74) *Attorney, Agent, or Firm* — David B. Woycechowsky

(57) ABSTRACT

Chat through computer with multiple virtual assistants who talk to and listen to each other, as well as the human participant(s). Each of the multiple virtual assistants is represented in a visual, virtual reality or augmented reality, display, such as the display built into augmented reality goggles. Each of the multiple virtual assistants is represented in this display by an anthropomorphic avatar (for example, a cartoon style person or robot or talking animal).

6 Claims, 5 Drawing Sheets

CHAT INTERACTION WITH MULTIPLE VIRTUAL ASSISTANTS AT THE SAME TIME

BACKGROUND

The present invention relates generally to the field of virtual assistants and more particularly to the field of virtual assistants that interface communicatively with human user(s) through an augmented reality (AR) interface.

The Wikipedia entry for "virtual assistant" (as of 11 May 2021) states, in part, as follows: "An intelligent virtual assistant (IVA) or intelligent personal assistant (IPA) is a software agent that can perform tasks or services for an individual based on commands or questions. The term 'chatbot' is sometimes used to refer to virtual assistants generally or specifically accessed by online chat. In some cases, online chat programs are exclusively for entertainment purposes. Some virtual assistants are able to interpret human speech and respond via synthesized voices. Users can ask their assistants questions, control home automation devices and media playback via voice, and manage other basic tasks such as email, to-do lists, and calendars with [spoken natural language] commands . . . . Virtual assistants use natural language processing (NLP) to match user text or voice input to executable commands. Many continually learn using artificial intelligence techniques including machine learning." (footnotes omitted)

U.S. patent Ser. No. 10/809,876 ("Brown") states as follows: "Techniques and architectures for implementing a team of virtual assistants are described herein. The team may include multiple virtual assistants that are configured with different characteristics, such as different functionality, base language models, levels of training, visual appearances, personalities, and so on. The characteristics of the virtual assistants may be configured by trainers, end-users, and/or a virtual assistant service. The virtual assistants may be presented to end-users in conversation user interfaces to perform different tasks for the users in a conversational manner. The different virtual assistants may adapt to different contexts. The virtual assistants may additionally, or alternatively, interact with each other to carry out tasks for the users, which may be illustrated in conversation user interfaces."

SUMMARY

According to an aspect of the present invention, there is a method, computer program product and/or system that performs the following operations (not necessarily in the following order): (i) receive request to start a requested chat session; (ii) identify the participating human user(s) who will participate in the requested chat session; (iii) identify a plurality of participating chatbots, respectively implemented and provided by a plurality of chatbot servers; (iv) instantiating a computer network chat session including the participating human user(s) and the participating chatbots; and (v) hosting a representation of the chat session on an augmented reality computer system of a first human user of the participating human user(s).

DETAILED DESCRIPTION

Figure 1:
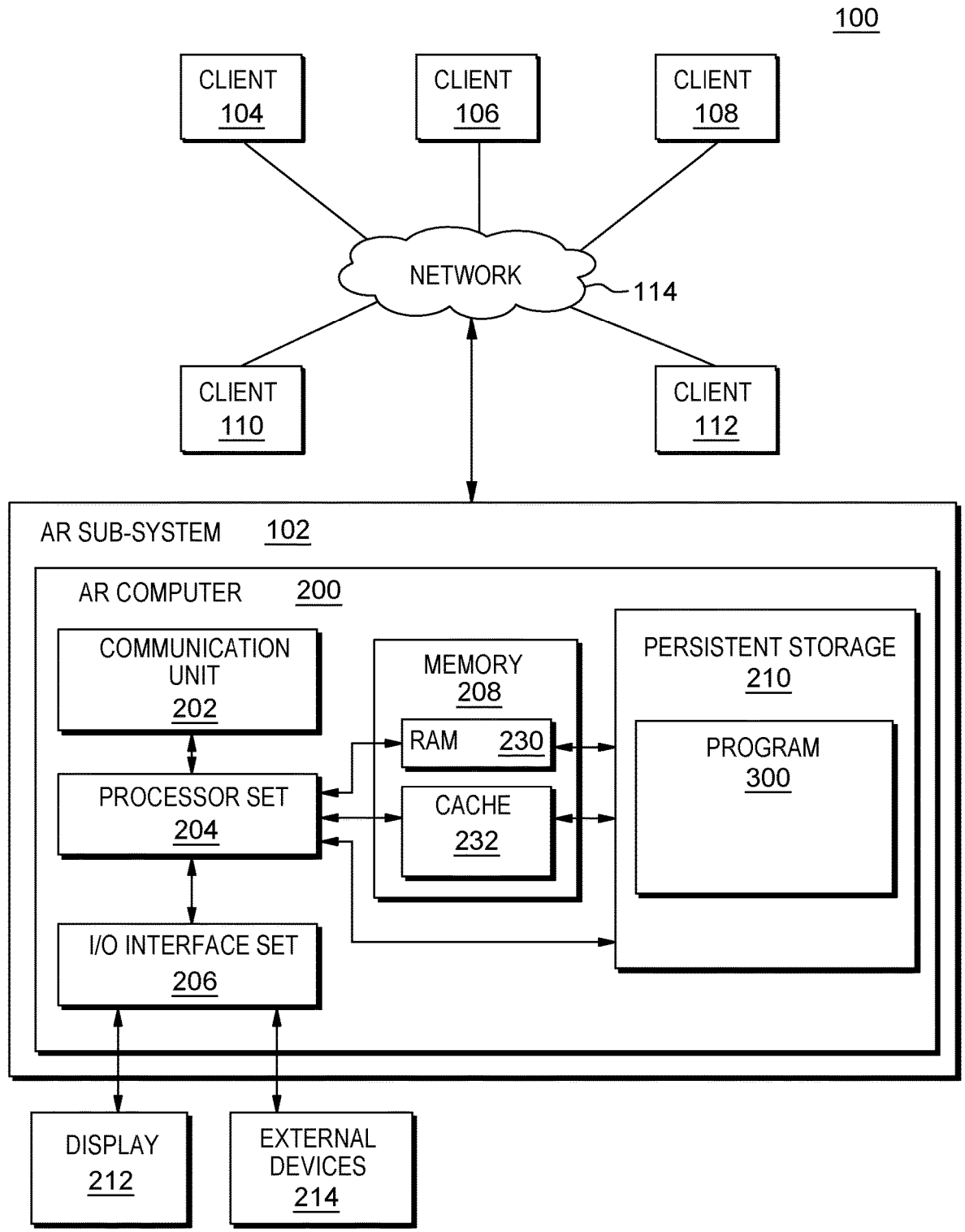
FIG. 1 is a block diagram of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semi-conductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: AR subsystem 102 (sometimes herein referred to, more simply, as subsystem 102); client subsystems 104, 106, 108, 110, 112; and communication network 114. AR subsystem 102 includes: AR computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with AR computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
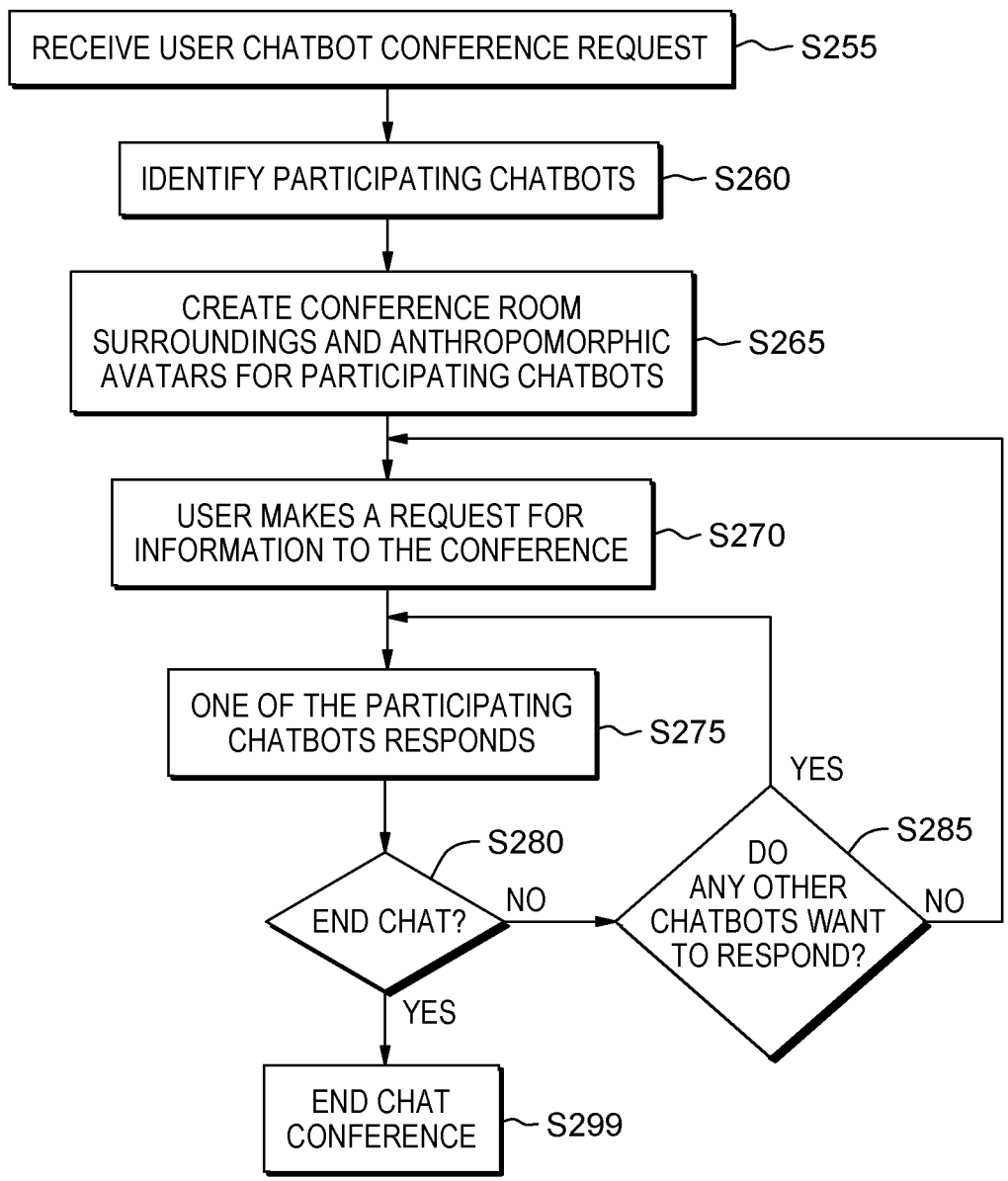
FIG. 2 is a flowchart showing a first embodiment method performed, at least in part, by the first embodiment system.
Figure 3:
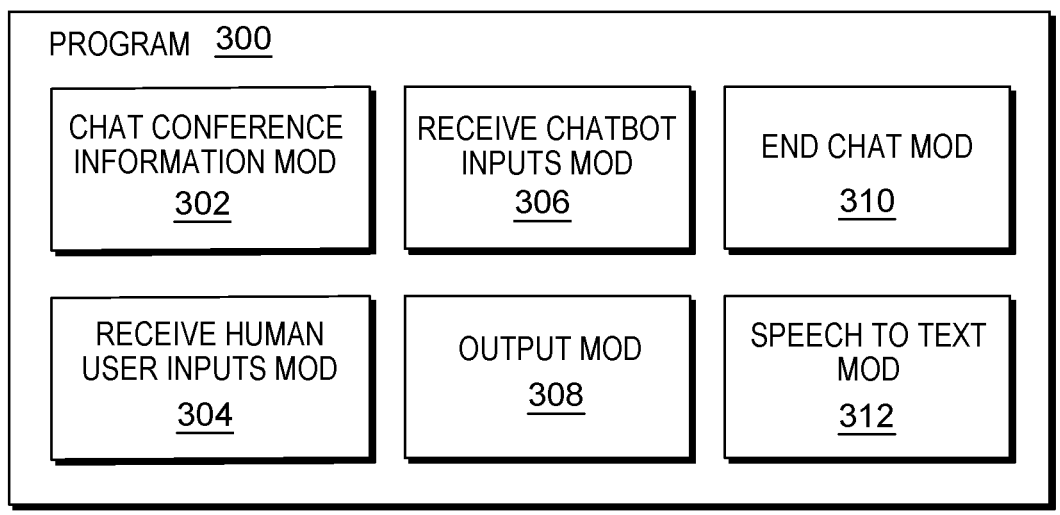
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where receive human user inputs module ("mod") 304 receives a request to start an online chat from the human user. In this example, the user command that effectively requests the chat is the user speaking out the following words: "I want a conference about my vaccine options." This command is picked up and processed by AR subsystem 102, which, in this example, is in the form of a wearable augmented reality computer system including typical accoutrements. For example, display 212 is present in the form of AR goggles with a built-in microphone. In this example, the chat request identifies topic(s) or question(s) to be discussed at the chat, but does not include an identity of which chatbots should participate in the upcoming chat. Alternatively: (i) the request may specify the identity of some, or all, chatbots to be present in the chat; and/or (ii) the request might not include an identification of topics or questions.

Figure 4:
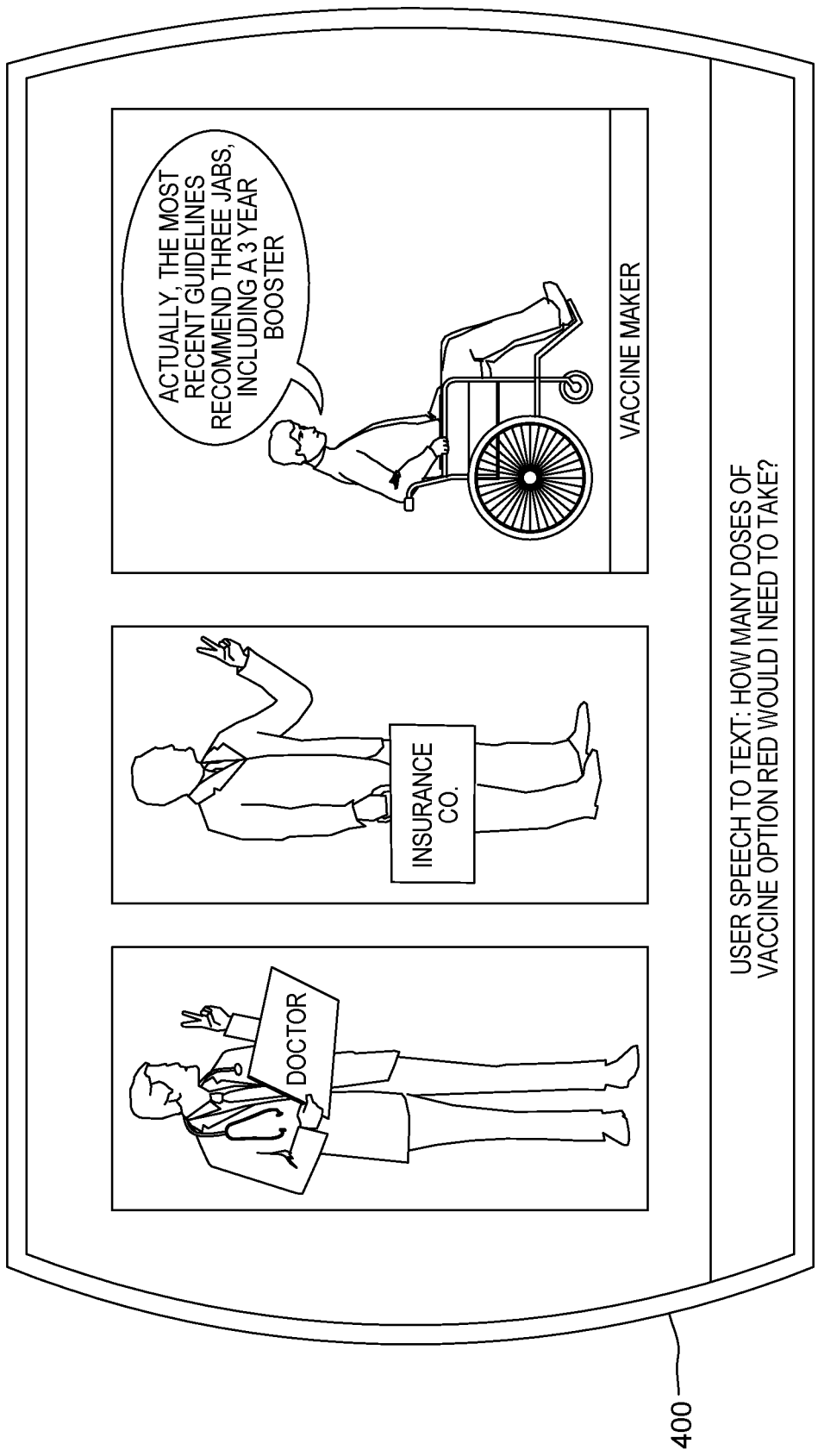
FIG. 4 is a screenshot view generated by the first embodiment system.

Processing proceeds to operation S260, where chat conference initiation mod 302 decides which chatbots would likely be useful to have in the upcoming requested chat session. In this case, the user of AR subsystem 102 is considering which vaccine she should choose—there are multiple options. Based on this, and in this example, the machine logic based rules of mod 302 determine that it would be best to have a chatbot representing the user's doctor, a chatbot representing the user's health insurance company and a chatbot representing the vaccine makers who make the various vaccine options. As shown in screenshot 400 of FIG. 4, these are the multiple chatbots that will soon be included in a chat with the human user.

Processing proceeds to operation S265, where mod 302 creates: (i) a virtual conference room backdrop for the upcoming chat; and (ii) anthropomorphic avatars for the participating chatbots (see, for example, the chatbots visually represented in screenshot 400). This effectively starts the chat session, such that the human user can start collectively and interactively communicating with the chatbot(s) at any time.

Processing proceeds to operation S270, where the user makes a request for information to the assembled virtual conference through receive human user inputs mod 304 of program 300 of AR subsystem 102. More specifically, the user speaks a question out loud, which is transduced into a signal by the built-in microphone of the AR goggles that are included in display 212 of AR subsystem 102. After this, speech to text mod 312 converts the speech to text and sends the text to the display of the virtual conference (see human user's question in screenshot 400) and also to the software constituting and controlling the various chatbot participants. In this example: (i) chatbot for the doctor's office resides in client subsystem 104; (ii) chatbot for the insurance company resides in client subsystem 106; and (iii) chatbot for the vaccine maker(s) resides in client subsystem 108. In this example, and as shown in screenshot 400, the first request for information by the human user relates to the number of doses recommended with respect to a certain vaccine option.

Processing proceeds to operation S275, where receive chatbot inputs mod 306 receives a response from one of the participating chatbots to the first request for information from the user. In this example, the doctor chatbot is the first to indicate a response, and the response indicated by the doctor chatbot residing in client subsystem 104 is that the doctor's chatbot's visual representation (that is, its anthropomorphic avatar shown in screenshot 400) is instructed to indicate the number two (2) using body language (to better establish eye contact with the user). In response to this instruction, output mod 308 displays the doctor's avatar in the conference so that she has two fingers held up to indicate the number two (2) (see, screenshot 400).

Processing proceeds to operation S280, where end chat mod 310 determines whether it is time to end the chat. In this example, the chat is to be ended when one of the following two conditions occur: (i) the human user leaves the chat; and/or (ii) all of the chatbots leave the chat (by sending appropriate predetermined signals to receive chatbots inputs mod 306). At this point in the processing, the chat does not meet conditions for termination, meaning that processing proceeds to operation S285, where it is determined that the insurance company representative chatbot would like to respond.

Processing loops back to a second instance of operation S275, where insurance company chatbot, residing in client subsystem 106, responds by holding up two fingers. In this example, the insurance company chatbot responds almost immediately after the doctor chatbot has responded, back at the first instantiation of operation S275, discussed above, which means that the insurance company chatbot is making its response independently of the other participating chatbots. Rather, the insurance company chatbot's answer was based only upon: (i) the user's question; and (ii) the knowledge base(s) to which the insurance company chatbot has access. This receipt of independent responses is sometimes considered as a favorable thing, like in this example, where the independent responses which agree with each other enhances confidence in believing that two (2) is the correct answer to the user's first request for information. Processing loops back through operations S280 and S285 because the vaccine maker(s) representative chatbot also wants to make a response.

Processing loops back to a third instance of operation S275, where insurance company chatbot, residing in client subsystem 108, responds by causing a speech bubble (see screenshot 400) and audio message making a statement to the effect that the answer of two (2) is incorrect because it is based on outdated information, and that the correct answer is now considered as three (3). In this example, the vaccine maker(s) chatbot responds in a manner that depends on the responses of the other chatbots. In other words, the vaccine maker's answer was based upon: (i) the user's question; (ii) the knowledge base(s) to which the vaccine maker(s) chatbot has access; and (iii) the responses of the other chatbot. In this example, the vaccine maker's chatbot is contradicting and correcting the other chatbots, or at least trying to. Other examples of a chatbot response that is dependent upon previous responses of other chatbots will be discussed, below, in the next sub-section of this Detailed Description section. This receipt of dependent responses is often considered as a favorable thing because later chatbot answers can confirm, deny, correct, refine and/or augment answers given by the other chatbots to the same user query (that is, the user's first request for information).

Because the conditions for ending the chat are not met, and further because no other chatbot wants to make a further response to the user's first request for information, processing proceeds through operations S280, S285 and then loops back for a second instance of operation S270, where the user keeps the chat active by asking further questions to the assembled virtual conference. In this example, the human user is not sure whether to believe the answer of the doctor's and insurance company's chatbots, or, alternatively, to believe the dissenting answer of the vaccine maker's chatbot. For this reason, the user's further questions will be directed to getting further answers from the various chatbots to help decode which conflicting answer is most likely to be correct (for example, a question about the release date of the study that the vaccine maker's chatbot is referencing in its first answer).

When the chat is to be ended, processing proceeds to operation S299, where end chat mod 310 ends the chat.

Some embodiments of the present invention may include one, or more, of the following features, characteristics, advantages and/or operations: (i) uses GAN module (Generative Adversarial Networks) to create a conference call surrounding, so that respective avatar can be created; (ii) the participating chatbots will be shown a human avatar of each and every participating chatbots, and will be show the same in the AR glass, so that the user can feel like a conference; (iii) the user's requirements will be analyzed, and will be segmented based on each and every chatbot, and will be identifying the primary requirement; (iv) chatbot will internally be sharing the response with each other, and will be identifying appropriate reply from each and every chatbot; and/or (v) while the chatbots are performing conversation in the multi-party conference call alike visualization, the GAN module will be creating appropriate modification in the body language so that the user is performing multi-party conversation.

III. Further Comments and/or Embodiments

Some embodiments of the present invention recognize one, or more, of the following facts, potential problems and/or potential areas for improvement with respect to the current state of the art: (i) in current days, people are using different types of virtual assistance systems, like AI voice assistance system, chatbots, etc.; (ii) human users can ask questions through a voice-to-text interface, etc.; and/or (iii) in many situations, a user needs to interact with multiple Voice assistance system to create a complete plan.

As an example of item (iii) of the list in the previous paragraph, assume a human user is planning for a travel, so, the user needs to interact with multiple virtual assistance system and can create a holistic plan. For example, to book a hotel, the user needs to interact with virtual assistance of Hotel, now, for local travel, the user is also chatting with Local travel virtual assistance, the user might want to perform some shopping, so might interact with virtual assistance of shopping, etc. It means, the user has to interact with multiple virtual assistance systems (individually or together). If user has to interact with multiple virtual assistance systems at a time, and one Virtual Assistance system received input from other virtual assistance system in association with the user, then we need a proper user interface where the user and two or more virtual assistance system can interact with each other.

Some embodiments of the present invention may include one, or more, of the following operations, features, characteristics and/or advantages: (i) AR enabled system creates a human avatar (that is, an anthropomorphic visual representation) of each and every participating virtual assistant with AR glass (that is, AR goggles); (ii) the participating human user(s) and the participating virtual Assistances can perform human like voice collaboration with each other with AR interface; (iii) the participating human user(s) create a collaborative plan along with the multiple participating virtual assistants; and/or (iv) a proper user interface where the user and two or more virtual assistance system can interact with each other.

In some embodiments, if a user needs to interact with multiple virtual assistance system at a time, then Augmented Reality (AR) system will be connecting to each and every virtual assistance system and will be creating Human Avatar for each of the participating virtual assistance system individually and the same will be visualized in the AR interface. In some embodiments, the human avatars of the participating virtual assistance and the user can perform voice interaction with each other, and based on voice question of the user in the AR interface, one or more human avatar of the virtual assistance will be responding with appropriate information. In some embodiments, during collaborative voice conversation with multiple virtual assistance and the user, the each and every virtual assistance system will be receiving voice conversation, and the same will be used for voice reply by individual voice assistance system. In some embodiments, while interacting with multiple virtual assistance system with AR interface, the user can also have one to one interaction with any single virtual assistant. In some embodiments, the user's eye direction, whisper talking and/ or finger direction are monitored and detected in order to identify which participating virtual assistant should listen and reply to the user.

In some embodiments, while having interaction with multiple virtual assistants, the user can ask to join one or more virtual assistant or can ask to drop from the collaborative conversation and can participate in the collaborative discussion. In some embodiments, multiple users can also participate while performing collaborative voice interaction with multiple virtual assistants. In some embodiments, multiple users can submit voice request to the conversation.

Figure 5:
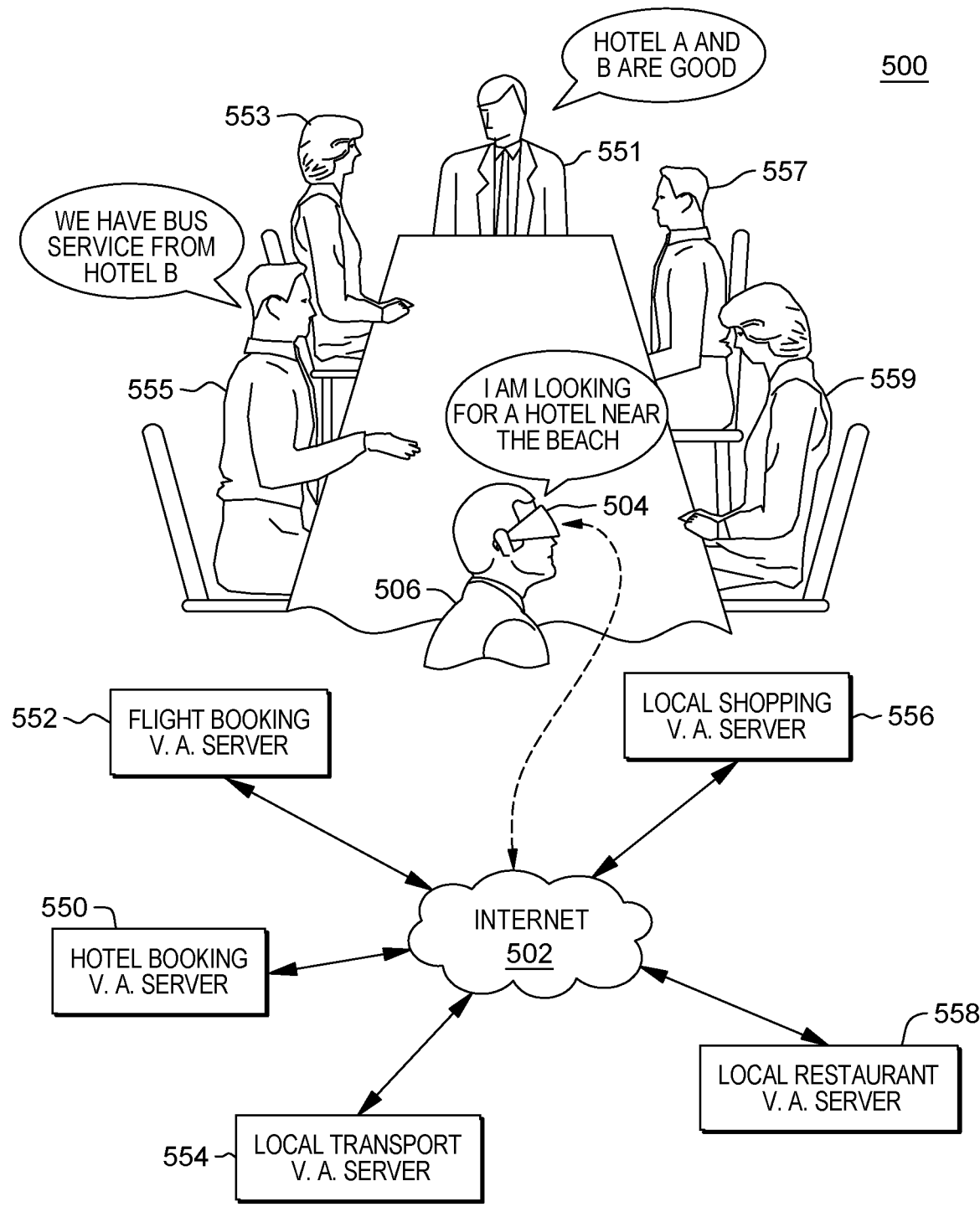
FIG. 5 is a block diagram of a second embodiment of a system according to the present invention.

As shown in FIG. 5, system 500 includes: internet 502; participating human user 506; AR sub-system 504 (which is wirelessly connected in data communication with internet 502 as indicated by the dotted double arrow in FIG. 5); hotel booking virtual assistant server 550 (represented in the chat conversation by anthropomorphic avatar 551); flight booking virtual assistant server 552 (represented in the chat conversation by anthropomorphic avatar 553); local transport virtual assistant server 554 (represented in the chat conversation by anthropomorphic avatar 555); local shopping virtual assistant server 556 (represented in the chat conversation by anthropomorphic avatar 557); and local restaurant virtual assistant server 558 (represented in the chat conversation by anthropomorphic avatar 559).

FIG. 5 shows how a human user may interact with multiple virtual assistants at the same time. In this embodiment, each of the virtual assistants are participating over a common time period (that is, the time period of the chat conversation), and collaborating with each other as a collaborative voice-based meeting.

A method, according to an embodiment of the present invention, includes the following operations: (i) each and every virtual assistant will be identified uniquely, and each and every virtual assistance will be made for a specific purpose; (ii) each and every virtual assistance will be having their own knowledge corpus, and will be replying user's request from the knowledge corpus; (iii) use of a a head mounted AR module, if the user needs to interact with multiple virtual assistants, then the user will be wearing AR glass to interact; (iv) connecting with each and every virtual assistant that will be participating in a given chat conversation; (v) communicating with the virtual assistants, and will be identifying the types of virtual assistance, like hotel booking, flight booking, etc.; (vi) based on the types of the participating virtual assistance systems, the AR glass will be creating appropriate human avatar; (vii) the human avatar of the virtual assistance will be displayed within user's FoV (field of vision); (viii) for any activity, if the user wants to interact with multiple virtual assistance systems, then the proposed system will be creating each and every human avatar in the display portion of the user interface; and (ix) the participating virtual assistant's virtual avatars are displayed in display hardware built into the AR glass, and, accordingly, the user can visualize a collaborative surrounding.

In some embodiments, multiple users can also participate in the conversation and can view each and every virtual assistant's human avatar. In some embodiments, the participating users can ask voice question in the collaborative environment, and accordingly the participating virtual assistance will be listening to the user's voice request. In some embodiments, based on the context of the voice command, each of the participating virtual assistance will be listening to the question. In some embodiments, based on the context of the voice command, the participating virtual assistances will be communicating with each other and will be identifying which of the participating virtual assistant(s) should be participating in the voice reply. In some embodiments, one or more virtual assistance can be identified to provide the reply and accordingly the virtual assistances will be creating reply sequence based on relevancy of the context.

In some embodiments, the human avatar of any virtual assistance will be replying to the user, and at the same time, other virtual assistances will also be listening to the reply from any virtual assistance. In some embodiments, based on the user's voice question, and reply from any Voice assistance system, other virtual assistance system will also be replying additional reply from different virtual assistance system. In some embodiments, the user will be interacting with virtual human avatar of each and every virtual assistance system and both the human and the virtual assistances will be collaborating with each other, In some embodiments, a user can also perform one to one interaction with any virtual assistance, in this case user can select any finger direction, eye direction or whisper communication towards any virtual assistance human avatar. In some embodiments, based on user's voice question to one to one virtual assistance, the AR glass will be creating appropriate security layer, in this case the security layer will be selecting only one virtual assistant (or only a subset of the participating virtual assistants), the user's request will not be sent to other virtual assistance.

In some embodiments, based on the collaboration, at any time, the user can ask one or more virtual assistance to drop from the conversation and accordingly the said virtual assistance system will be dropped. In some embodiments, based on the need of conversation, the user can also ask one or more virtual assistance to join in the conversation, and accordingly human avatar will be joining.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

Virtualized computing environments (VCEs): VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Cloud computing system: a computer system that is distributed over the geographical range of a communication network(s), where the computing work and/or computing resources on the server side are primarily (or entirely) implemented by VCEs (see definition of VCEs in previous paragraph). Cloud computing systems typically include a cloud orchestration module, layer and/or program that manages and controls the VCEs on the server side with respect to instantiations, configurations, movements between physical host devices, terminations of previously active VCEs and the like.

What is claimed is:

1. A computer-implemented method (CIM) comprising: receive request to start a requested chat session; identify the participating human user(s) who will participate in the requested chat session; identify a plurality of participating chatbots, respectively implemented and provided by a plurality of chatbot servers; instantiating a computer network chat session including the participating human user(s) and the participating chatbots, with each participating chatbot of the plurality of participating chatbots is respectively displayed to the human user(s) as a human avatar that is present in a room where the participating human user(s) is located; and hosting a representation of the chat session on an augmented reality computer system of a first human user of the participating human user(s), and creating a security layer in order to select a first chatbot, of the plurality of chatbots, such that only the selected chatbot is able to listen and respond to a received voice question from a human user; wherein the selected chatbot is identified by monitoring of the participating human user's eye direction; wherein the hosting of a representation includes showing the human avatars respectively corresponding to the plurality of chatbots in an augmented reality (AR) glass display of a first human user, so that the first human user has an experience of participating in a conference.

2. The CIM of claim 1 further comprising:
analyzing the first human user's requirements;
segmenting the first human user's requirements based on every chatbot of the plurality of chatbots to identify a primary requirement of the first human user; and
internally sharing, by the plurality of chatbots, responses to queries with each other to improve the replies made by the chatbots to the first human user.

3. A computer program product (CPP) comprising:
a set of non-transitory storage device(s); and computer code stored collectively in the set of storage device(s), with the computer code including data and instructions to cause a processor(s) set to perform at least the following operations: receiving a request to start a requested chat session, identifying the participating human user(s) who will participate in the requested chat session, identifying a plurality of participating chatbots, respectively implemented and provided by a plurality of chatbot servers, with each participating chatbot of the plurality of participating chatbots is respectively displayed to the human user(s) as a human avatar that is present in a room where the participating human user(s) is located, instantiating a computer network chat session including the participating human user(s) and the participating chatbots, with each participating chatbot of the plurality of participating chatbots is respectively displayed to the human user(s) as a human avatar that is present in a room where the participating human user(s) is located, and hosting a representation of the chat session on an augmented reality computer system of a first human user of the participating human user(s), and creating a security layer in order to select a first chatbot, of the plurality of chatbots, such that only the selected chatbot is able to listen and respond to a received voice question from a human user; wherein the selected chatbot is identified by monitoring of the participating human user's eye direction; wherein the hosting of a representation includes showing the human avatars respectively corresponding to the plurality of chatbots in an augmented reality (AR) glass display of a first human user, so that the first human user has an experience of participating in a conference.

4. The CPP of claim 3 wherein the computer code further includes instructions for causing the processor(s) set to perform the following operation(s):
   analyzing the first human user's requirements;
   segmenting the first human user's requirements based on every chatbot of the plurality of chatbots to identify a primary requirement of the first human user; and
   internally sharing, by the plurality of chatbots, responses to queries with each other to improve the replies made by the chatbots to the first human user.

5. A computer system (CS) comprising: a processor(s) set; a set of storage device(s); and computer code stored collectively in the set of storage device(s), with the computer code including data and instructions to cause the processor(s) set to perform at least the following operations: receiving a request to start a requested chat session, identifying the participating human user(s) who will participate in the requested chat session, identifying a plurality of participating chatbots, respectively implemented and provided by a plurality of chatbot servers, instantiating a computer network chat session including the participating human user(s) and the participating chatbots, with each participating chatbot of the plurality of participating chatbots is respectively displayed to the human user(s) as a human avatar that is present in a room where the participating human user(s) is located, and hosting a representation of the chat session on an augmented reality computer system of a first human user of the participating human user(s), and creating a security layer in order to select a first chatbot, of the plurality of chatbots, such that only the selected chatbot is able to listen and respond to a received voice question from a human user; wherein the selected chatbot is identified by monitoring of the participating human user's eye direction; wherein the hosting of a representation includes showing the human avatars respectively corresponding to the plurality of chatbots in an augmented reality (AR) glass display of a first human user, so that the first human user has an experience of participating in a conference.

6. The CS of claim 5 wherein the computer code further includes instructions for causing the processor(s) set to perform the following operation(s):
   analyzing the first human user's requirements;
   segmenting the first human user's requirements based on every chatbot of the plurality of chatbots to identify a primary requirement of the first human user; and
   internally sharing, by the plurality of chatbots, responses to queries with each other to improve the replies made by the chatbots to the first human user.

* * * * *